April 12, 1932.   R. P. CALLARD ET AL   1,853,298
GLASS CUTTING APPARATUS
Original Filed Oct. 20, 1925
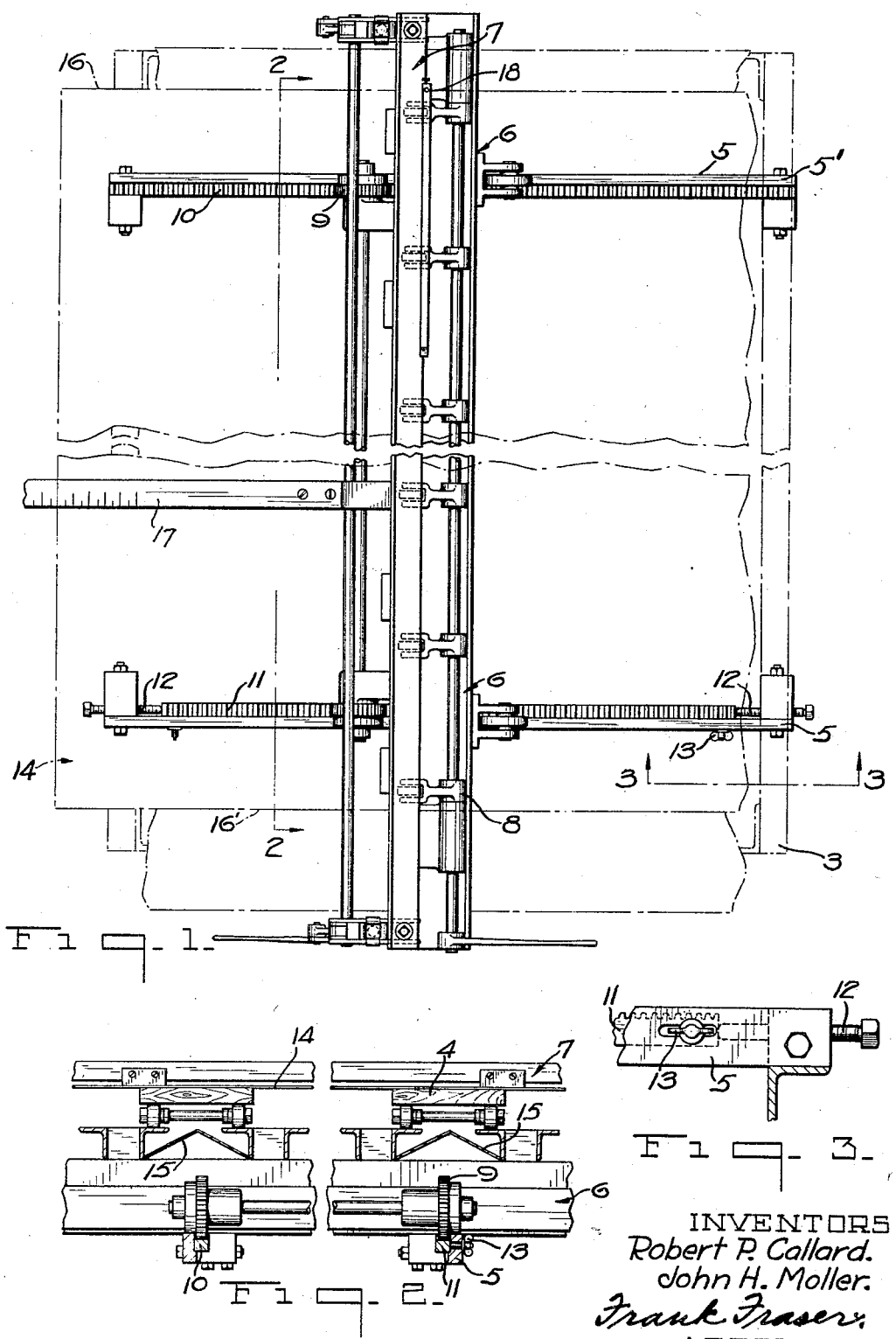
INVENTORS
Robert P. Callard.
John H. Moller.
Frank Fraser,
ATTORNEY.

Patented Apr. 12, 1932

1,853,298

UNITED STATES PATENT OFFICE

ROBERT P. CALLARD AND JOHN H. MOLLER, OF CHARLESTON, WEST VIRGINIA, ASSIGNORS TO LIBBEY-OWENS-FORD GLASS COMPANY, OF TOLEDO, OHIO, A CORPORATION OF OHIO

GLASS CUTTING APPARATUS

Original application filed October 20, 1925, Serial No. 63,623. Divided and this application filed January 13, 1926. Serial No. 80,878.

The present invention relates to improvements in sheet glass cutting apparatus.

An important object of the invention is to provide a glass cutting apparatus with means whereby a continuous ribbon of glass may be divided into lights or sheet lengths having their opposite edges parallel.

A further object of the invention is to provide a glass cutting apparatus with means whereby the ends of said apparatus will remain parallel with the longitudinal axis of the sheet.

Another object of the invention is to reduce as near as possible edge waste ordinarily incurred when cutting lights of glass from a continuously moving ribbon of glass.

Other objects and advantages of the invention will become apparent during the course of the following description.

In the drawings wherein like numerals are employed to designate like parts throughout the same, Fig. 1 is a plan view of the apparatus, Fig. 2 is a fragmental section taken on line 2—2 in Fig. 1, and Fig. 3 is a fragmental section taken on line 3—3 of Fig. 1.

This invention was first disclosed in our copending application, Serial No. 63,623, filed Oct. 20, 1925, of which the present application is a division. This invention is particularly well adapted for use in connection with the Colburn Patent 1,248,809, granted December 4, 1917, wherein a ribbon or sheet of glass is annealed in a horizontal leer and passed on a cutting table in a horizontal position. Of course this improved apparatus is not necessarily limited to the construction shown in the Colburn patent.

In the drawings the numeral 3 refers to parts of the stationary structure of the cutting table 4, on which the track 5 is mounted. Supported upon this track is a truck 6, carrying a glass scoring device 7 and breaking device 8, more fully disclosed in our copending application above referred to. Suitably attached to the truck 6 are pinions 9, which freely operate in racks 10 and 11 attached to the track 5. The rack 10 is stationarily mounted on the rail 5', while the rack 11 is movable back and forth longitudinally by the jack screws 12, so when it is desired to line up both ends of the truck it is necessary to adjust only the one rack 11 by the jack screws 12, and after proper adjustment is attained, it may be locked in position by the thumb screws 13. A detail of the thumb screw locking means is shown in Fig. 3. During the scoring and breaking of the sheet 14, there is a possibility of particles of glass or dirt becoming lodged between the teeth of the racks 10 and 11, and thus cause the ends of the truck 6 to become out of line. In order to prevent this possibility, guards 15 are suitably placed above the racks and pinions.

Heretofore, the ribbon has been divided into sheet lengths by an operator positioned at the end of the leer and alongside of the cutting table, the type of cut being dependent upon the skill of the particular operator. If the score is not parallel to the preceding cut or at right angles to the edges of the sheet, considerable waste results when the sheet is squared up for commercial use. It is believed that the improvements covered by the present invention will overcome this objection as the cutting and breaking device travels with the moving sheet and parallel with its edges, being held in parallelism by the rack and pinion arrangement above described.

In the operation of the present invention the continuously moving glass ribbon 14 passes from the annealing leer onto the cutting table 4. The ends of the truck are then made to travel parallel with the glass ribbon edges 16 and 16' by the rack and pinion mechanism previously described. After a predetermined length of the glass ribbon is measured off by the gauge stick 17, attached to the scoring means, a sheet is separated from said ribbon by the scoring and breaking means covered in our copending application, thus producing a sheet whose opposite edges are parallel and whose adjacent edges are at right angles.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass cutting apparatus, a moving table for supporting a moving sheet of glass, a truck arranged in proximity to said table, a cutter guide carried by the truck and movable with the sheet, pinions attached to the truck, and racks engageable by said pinions for supporting said truck, one of said racks being adjustable longitudinally of itself to permit the glass to be separated perpendicular to the sheet edges.

2. In a glass cutting apparatus, a movable table for supporting a moving sheet of glass, a truck carrying a cutter guide and breaker arms, movable as a unit by the sheet, tracks secured to the table for supporting the truck, pinions attached to the truck, racks attached to the respective tracks for cooperation with the respective pinions for properly guiding the truck thereon, and means for adjusting one of the racks longitudinally of itself to permit the cutter guide and breaker arms to advance in parallelism with the longitudinal axis of the moving sheet.

3. In glass cutting apparatus, means for supporting a sheet to be cut, a truck arranged in proximity to the sheet supporting means, a cutter guide carried by the truck, interconnected pinions attached to the truck, racks engageable by said pinions for supporting said truck, means for adjusting one of said racks longitudinally of itself for properly lining up the opposite ends of said truck, means for locking the truck in adjusted position, and a guard for protecting the racks and pinions from broken glass, etc.

4. In sheet glass cutting apparatus, a table for supporting the sheet, a guide for a scoring tool extending across the sheet, means associated with the cutter guide for breaking the glass after it has been scored, and means carried by said table for supporting the cutter guide and breaking means said last-named means having portions interengaging with the cutter guide and being adjustable longitudinally of itself to effect lining up of the opposite ends of said cutter guide.

Signed at Charleston, in the county of Kanawha, and State of West Virginia, this 7th day of January, 1926.

ROBERT P. CALLARD.
JOHN H. MOLLER.